(12) United States Patent
Grandadam

(10) Patent No.: US 12,669,238 B2
(45) Date of Patent: *Jun. 30, 2026

(54) PORTABLE LIGHTING DEVICE WITH MULTIPLE MOUNTING FEATURES AND CONFIGURATIONS

(71) Applicant: Promier Products Inc., Peru, IL (US)

(72) Inventor: Cody Duane Grandadam, Peru, IL (US)

(73) Assignee: Promier Products Inc., Peru, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/081,481

(22) Filed: Mar. 17, 2025

(65) Prior Publication Data

US 2025/0237371 A1     Jul. 24, 2025

Related U.S. Application Data

(63) Continuation of application No. 18/360,878, filed on Jul. 28, 2023, now Pat. No. 12,253,240, which is a continuation of application No. 17/878,273, filed on Aug. 1, 2022, now Pat. No. 11,719,420, which is a
(Continued)

(51) Int. Cl.

| | |
|---|---|
| *F21V 21/14* | (2006.01) |
| *F16M 13/00* | (2006.01) |
| *F21L 4/00* | (2006.01) |
| *F21V 21/08* | (2006.01) |
| *F21V 21/088* | (2006.01) |

(Continued)

(52) U.S. Cl.
CPC ............ *F21V 21/145* (2013.01); *F21L 4/005* (2013.01); *F21V 21/08* (2013.01); *F21V 21/0885* (2013.01); *F21V 21/0965* (2013.01); *F16M 13/005* (2013.01); *F21Y 2115/10* (2016.08)

(58) Field of Classification Search
CPC . F21V 21/145; F21V 21/0885; F21V 21/0965
See application file for complete search history.

(56) References Cited

U.S. PATENT DOCUMENTS

| | | | | | |
|---|---|---|---|---|---|
| 5,595,436 | A | * | 1/1997 | Way, Jr. .................... | F21L 2/00 362/190 |
| 9,541,244 | B1 | * | 1/2017 | Berezinski .......... | F21V 21/0965 |
| 9,638,379 | B2 | * | 5/2017 | Sun ......................... | F21V 21/08 |

(Continued)

*Primary Examiner* — William N Harris

(74) *Attorney, Agent, or Firm* — Barnes & Thornburg LLP

(57) ABSTRACT

A portable lighting device allowing for hands-free lighting in various angular orientations relative to a support surface upon which the portable lighting device is situated. The device includes a front body having a frontal opening and an illumination assembly having a light source that emits light through the frontal opening. A central support is affixed to the front body and has a securement means extending from an upper extent of the central support. A rear body is affixed to the central support and a kickstand is pivotally connected to a wall of the rear body. The kickstand orients a lower portion of the front body at a desired support angle α relative to a support surface upon which the portable lighting device rests in order to direct the emitted light in a specific direction desired by an operator of the portable lighting device. A rechargeable, internal power source is operably configured to power the illumination assembly.

22 Claims, 12 Drawing Sheets

Related U.S. Application Data continuation of application No. 17/147,983, filed on Jan. 13, 2021, now Pat. No. 11,402,085.

(60) Provisional application No. 62/960,304, filed on Jan. 13, 2020.

(51) Int. Cl.
  *F21V 21/096*    (2006.01)
  *F21Y 115/10*    (2016.01)

(56) References Cited

U.S. PATENT DOCUMENTS

| | | | | |
|---|---|---|---|---|
| 11,255,523 | B2 * | 2/2022 | Jackson | F21V 21/0885 |
| 2005/0265033 | A1 * | 12/2005 | Yang | F21V 21/0885 |
| | | | | 362/398 |
| 2006/0133074 | A1 * | 6/2006 | Lai | F21L 4/025 |
| | | | | 362/205 |
| 2007/0139917 | A1 * | 6/2007 | Ford | F21V 21/0885 |
| | | | | 362/208 |
| 2010/0277899 | A1 * | 11/2010 | Peak | B60Q 7/00 |
| | | | | 362/183 |
| 2011/0269336 | A1 * | 11/2011 | Nashimoto | F21V 21/145 |
| | | | | 439/504 |
| 2014/0140050 | A1 * | 5/2014 | Wong | F21V 14/025 |
| | | | | 362/217.1 |
| 2014/0321904 | A1 * | 10/2014 | Bao | F21L 14/026 |
| | | | | 403/132 |
| 2015/0131276 | A1 * | 5/2015 | Thompson | F21V 21/145 |
| | | | | 362/371 |
| 2015/0267902 | A1 * | 9/2015 | Zhang | F21V 21/30 |
| | | | | 362/188 |
| 2017/0108197 | A1 * | 4/2017 | Cacciabeve | F21V 15/01 |
| 2017/0231272 | A1 * | 8/2017 | Pontano | A24F 27/00 |
| | | | | 206/101 |
| 2018/0031188 | A1 * | 2/2018 | Sharrah | F21V 23/06 |
| 2018/0340661 | A1 * | 11/2018 | Inskeep | F21V 14/025 |
| 2019/0331326 | A1 * | 10/2019 | Proeber | F21V 23/0414 |
| 2020/0132282 | A1 * | 4/2020 | Harmon | F16M 11/041 |
| 2020/0173637 | A1 * | 6/2020 | Ormsbee | F21L 4/085 |
| 2021/0033248 | A1 * | 2/2021 | Cacciabeve | F21V 21/30 |

* cited by examiner

PORTABLE LIGHTING DEVICE WITH MULTIPLE MOUNTING FEATURES AND CONFIGURATIONS

CROSS-REFERENCE TO RELATED APPLICATIONS

This application is a continuation of U.S. patent application Ser. No. 18/360,878, filed Jul. 28, 2023; U.S. Pat. No. 11,719,420, filed Aug. 1, 2022; and U.S. Pat. No. 11,402, 085, filed Jan. 13, 2021, which claim the benefit of Provisional Patent Application No. 62/960,304, filed Jan. 13, 2020, all of which are incorporated in their entirety herein by reference and made a part hereof.

TECHNICAL FIELD

This disclosure relates to a portable lighting device, such as a flashlight, having multiple integrated mounting features providing multiple mounting configurations allowing for hands-free lighting in various situations and locations. In one mounting configuration, an external base such as a tripod is removably affixed to the lighting device. In other mounting configurations, the portable lighting device is: self-supported on a surface through the use of a moveable member (e.g., a "kickstand"), removably clipped to an external mount, and removably affixed by a magnet to a surface.

BACKGROUND

Existing lighting products enable a wide range of indoor, outdoor, and nighttime activities. Electronic lighting is typically provided from fixed installations (e.g., a roof, a wall, or ceiling), where a light source receives electrical power from a fixed, wired power source. Such lighting is useful in illuminating a particular area, but lacks the flexibility of a portable lighting source. Portable lighting sources, such as flashlights or lanterns, have been developed to provide illumination in varied locations and situations. However, such portable lighting sources can be difficult to orient when not held by a user. In the event that a user needs hands-free lighting, other methods of orienting the portable lighting system are needed.

Accordingly, there is an unmet need for a portable lighting device, such as a flashlight, that includes mounting features that allow for multiple mounting configurations while allowing the portable lighting device to remain oriented in a user-defined position without the need for the user to hold on to the device. A full discussion of the features and advantages of the present invention is deferred to the following detailed description, which proceeds with reference to the accompanying drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

Figure 1:
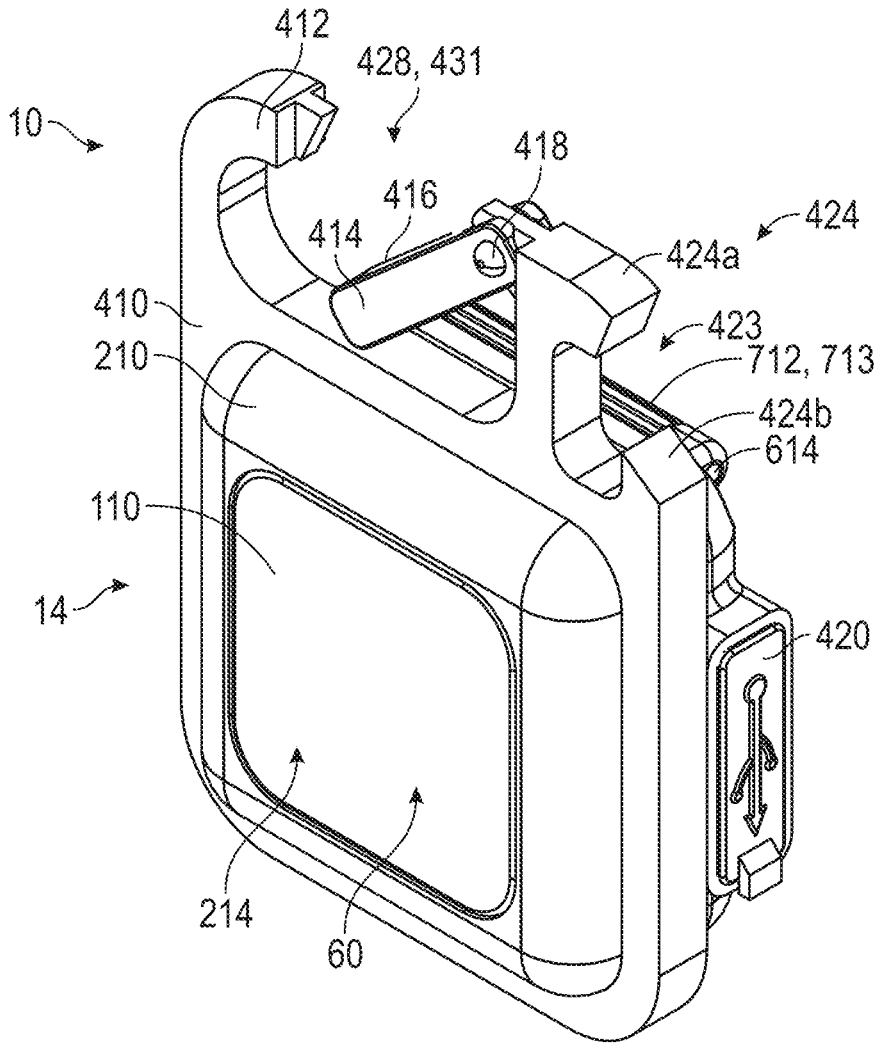
FIG. 1 is a front perspective view of a portable lighting device.

While the invention will be described in connection with the preferred embodiments shown herein, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

FIGS. 1-11 show a portable lighting device 10 having multiple mounting features providing multiple mounting configurations allowing for hands-free lighting in various situations and locations. In a first mounting configuration, an openable securement means 428 allows the portable light 10 to be removably affixed to an external object (e.g., loop on a backpack). In a second mounting configuration, a coupling means 514 enables the portable light 10 to be removably affixed to or engaged with a support surface having ferromagnetic materials or properties. In a third mounting configuration, a mounting means 622 allows the portable light 10 to be coupled to a threaded projection, such as a tripod. In a fourth mounting configuration, a multi-positional member 710 is deployed to support the portable light 10 on a surface in order to position the light that is emitted from the illumination assembly 300 at a desired angle and orientation. As such, the figures and the following description provide a portable lighting device 10 that can be selectively mounted in a plurality of ways to suit a user's lighting needs. The multiple mounting features and resultant multiple mounting configurations provide for hands-free lighting in various situations and locations, which increase the utility and functionality of the lighting device 10.

The portable light 10 includes a housing 14 that includes a front body or bezel 210, a central support 410, a rear body 610, and an interior retaining means 430. The housing 14 is designed to encase and protect the electronic components 60 of the portable light 10. Housing 14 including multiple mounting features and can be made from various materials (e.g., plastic, metal, etc.) and may be made using any suitable technique (e.g., injection molding, 3D printing, etc.). In certain embodiments, part of the housing 14 (e.g., the front bezel 210 and the rear body 610) may be made from one material (e.g., plastic), and another part of the housing 14 (e.g., central support 410) may be made from a second material (e.g., metal).

As shown in FIGS. 1, 2, 4, and 11, the front bezel 210 of the housing 14 includes an opening therein 214 and a pair of rearward extending projection 216a, 216b. The rearward extending projection 216a, 216b are configured to: (i) extend into grooves 434a, 434b that are formed within the interior retaining means 430 and (ii) past a rear extent 440 of the interior retaining means 430 in order to removably couple the front bezel 210 to the interior retaining means 430. By coupling the front bezel 210 to the interior retaining means 430, the front bezel 210 is also indirectly coupled to the remaining elements of the housing 14. The front bezel 210 is configured to retain the optic 110 within housing 14. Specifically, the lens 110 includes an optic ridge 112 that surrounds the optic 110. The optic 110 and the optic ridge 112 are dimensioned such that: (i) the front surface 110a of the optic 110 is substantially flat with the extent of the front bezel 210 and (ii) the optic ridge 112 is positioned behind an extent of the front bezel 210. This allows the front bezel 210 to retain the optic 110 within the housing 14.

As shown in FIGS. 1-7 and 9-11, the central support 410 that includes: (i) a body 427, (ii) a securement means 428, and (iii) a peripheral segment 424. The body 427 has a periphery that extends around the exterior of the body 427 and to the lowermost extent of the securement means 428 and the peripheral segment 424. The periphery of the central support body 427 extends past the outermost edge of the front bezel 210 and the rear body 610. This allows the central support body 427 to protect the front bezel 210 and the rear body 610 from impacts that may be experienced by the housing 14, when the housing 14 is dropped during use. This is desirable because it increases the durability of the light 10. The periphery of the body 427 is preferably substantially rectangular-shaped and more preferably substantially square-shaped. It should be understood that the periphery of the body 427 has a different shape, such as circle, triangle, pentagon, trapeze, ellipse, star, hexagon, octagon, rhombus, heart, or any other polygon.

Figure 11:
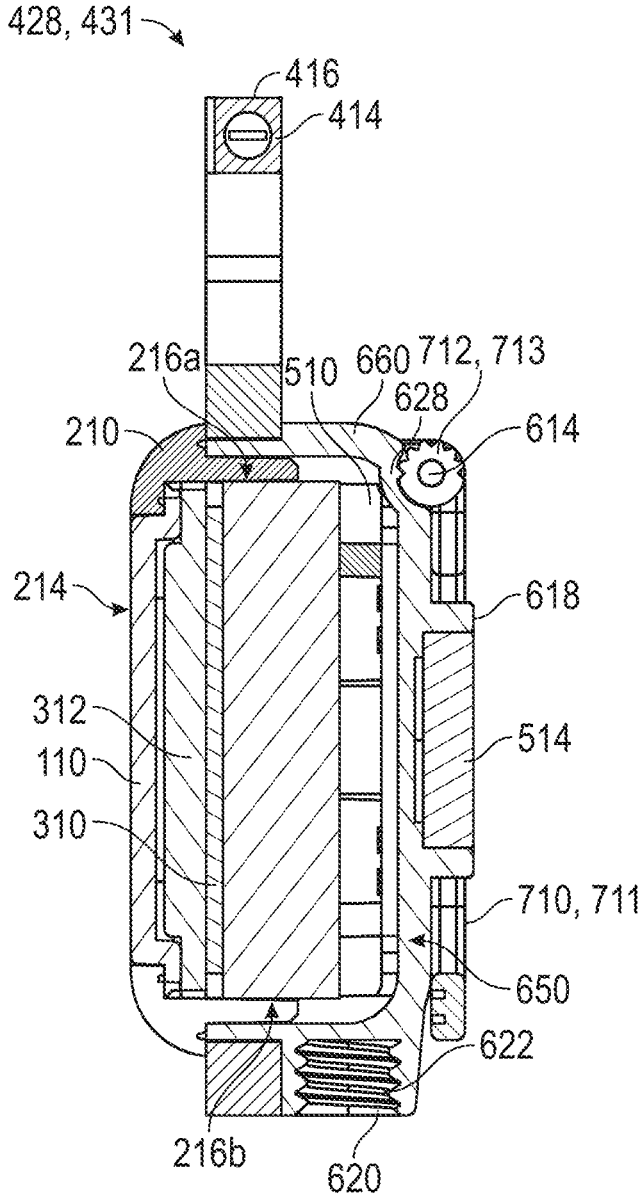
FIG. 11 is a cross-sectional view of the portable lighting device of FIG. 1, taken along line 11-11 of FIG. 5.

The body 427 also includes an opening 429 that is integrally formed in the center of the body 427. The opening is designed to receive an extent of the front bezel 210 and the rear body 610, such that the central support 410 is positioned between the front bezel 210 and the rear body 610. As best shown in FIG. 11, when the front bezel 210, central support 410, and rear body 610 are coupled to one another, the central support 410 is positioned closer to the front of the lens 110. This configuration also helps protect the lens 110 and the light source 312 because these components are typically more fragile than the power source 432.

Figure 2:
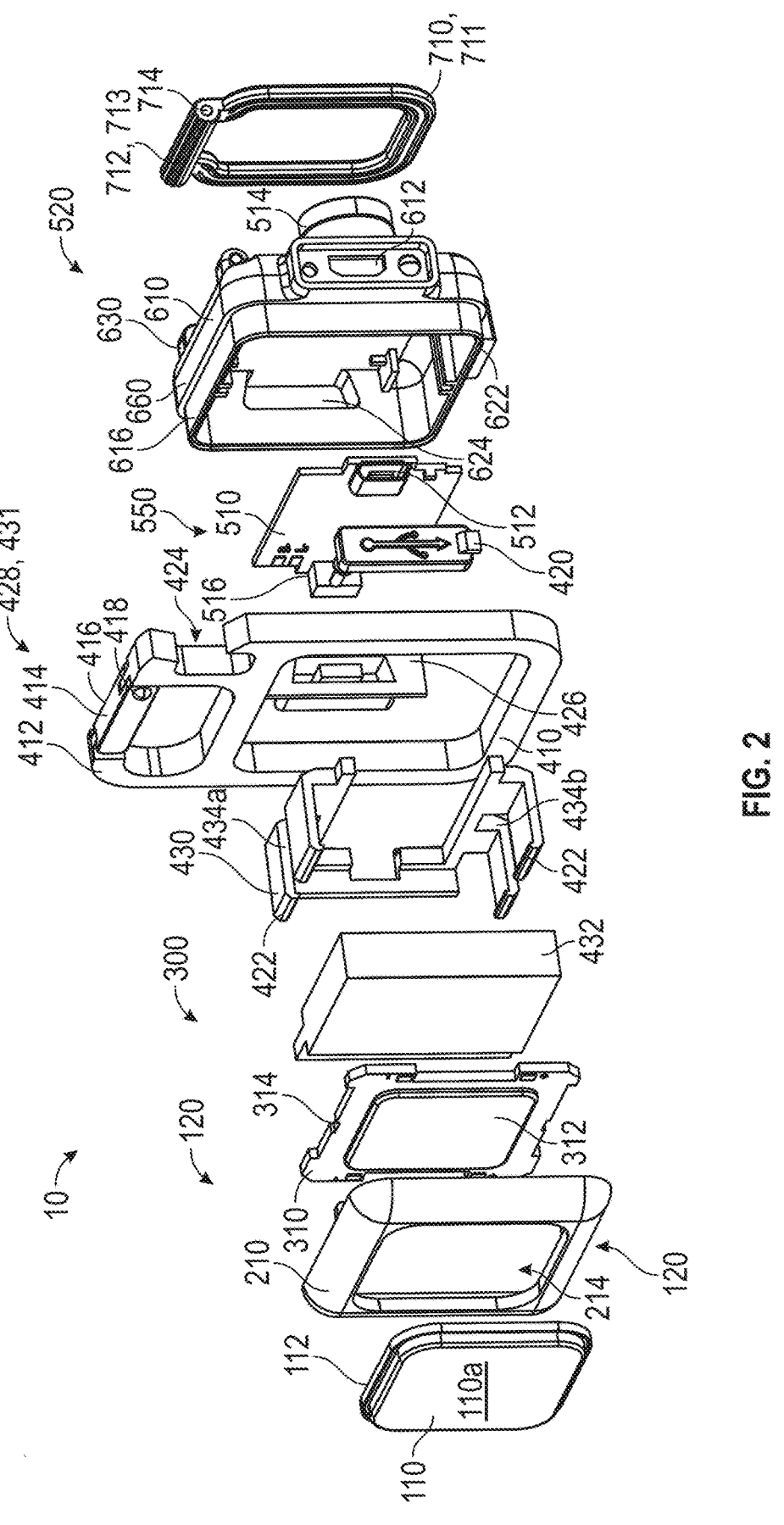
FIG. 2 is a first exploded view of the portable lighting device of FIG. 1.
Figure 3:
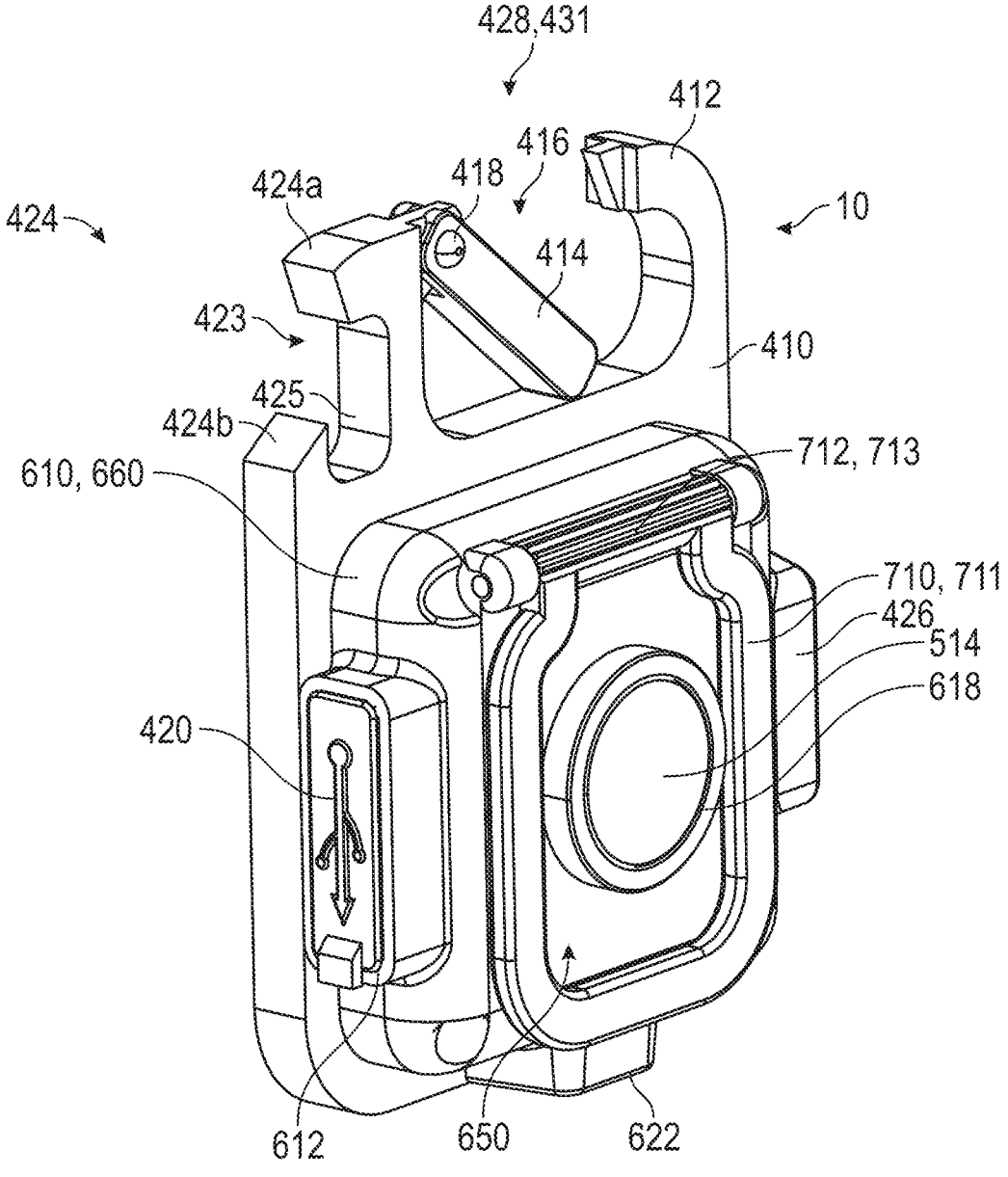
FIG. 3 is a rear perspective view of the portable lighting device of FIG. 1.
Figure 4:
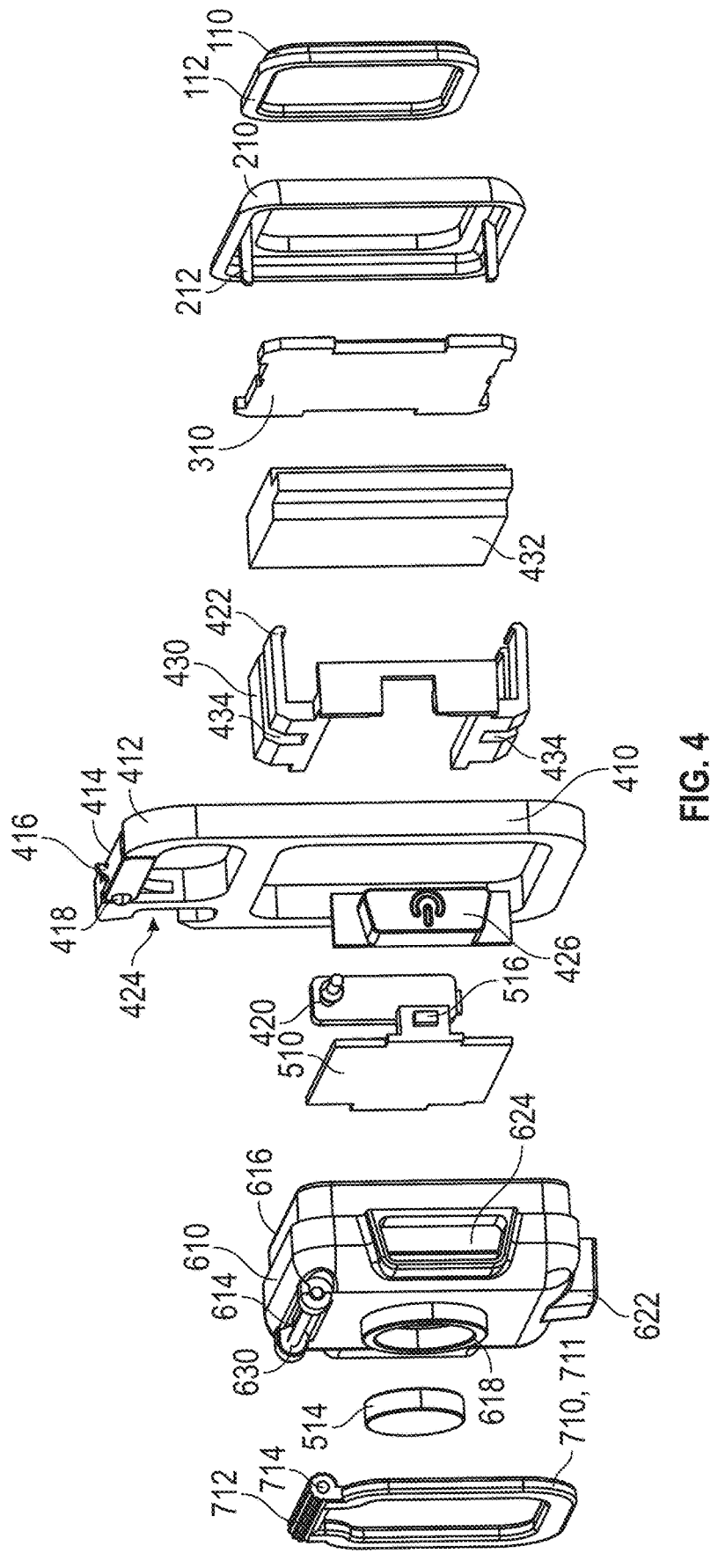
FIG. 4 is a second exploded view of the portable lighting device of FIG. 1.
Figure 5:
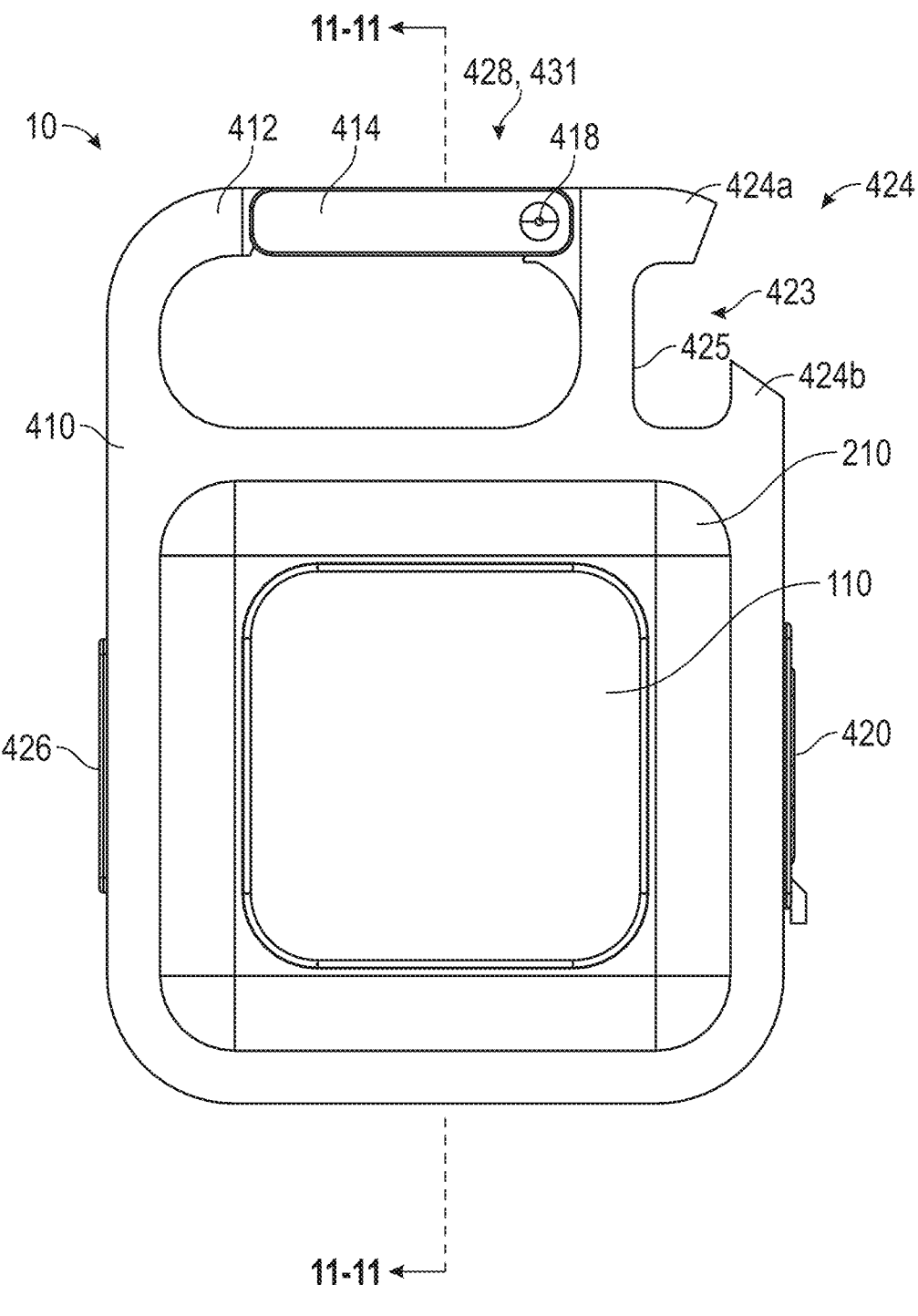
FIG. 5 is a front view of the portable lighting device of FIG. 1.
Figure 6:
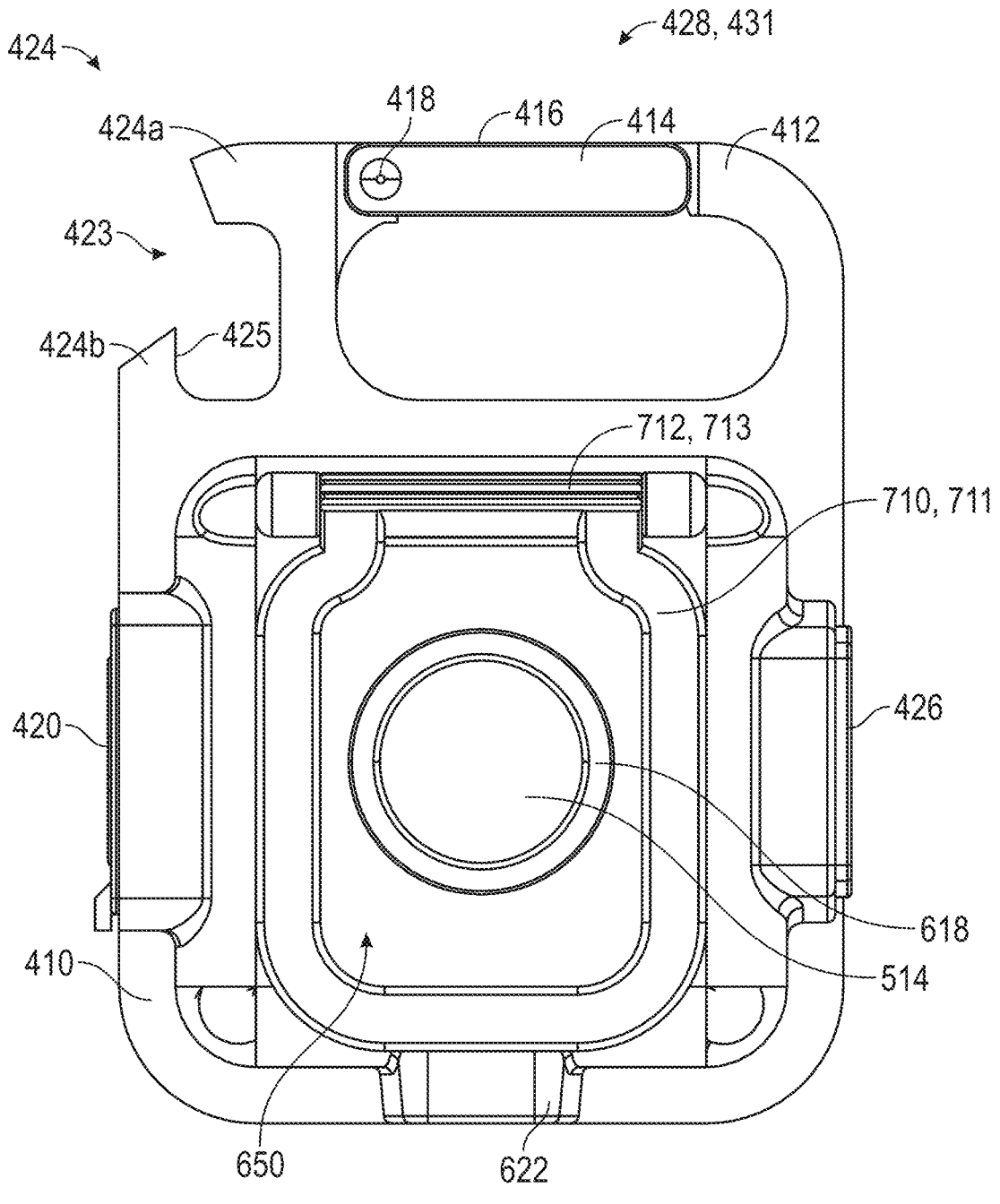
FIG. 6 is a rear view of the portable lighting device of FIG. 1.
Figure 7:
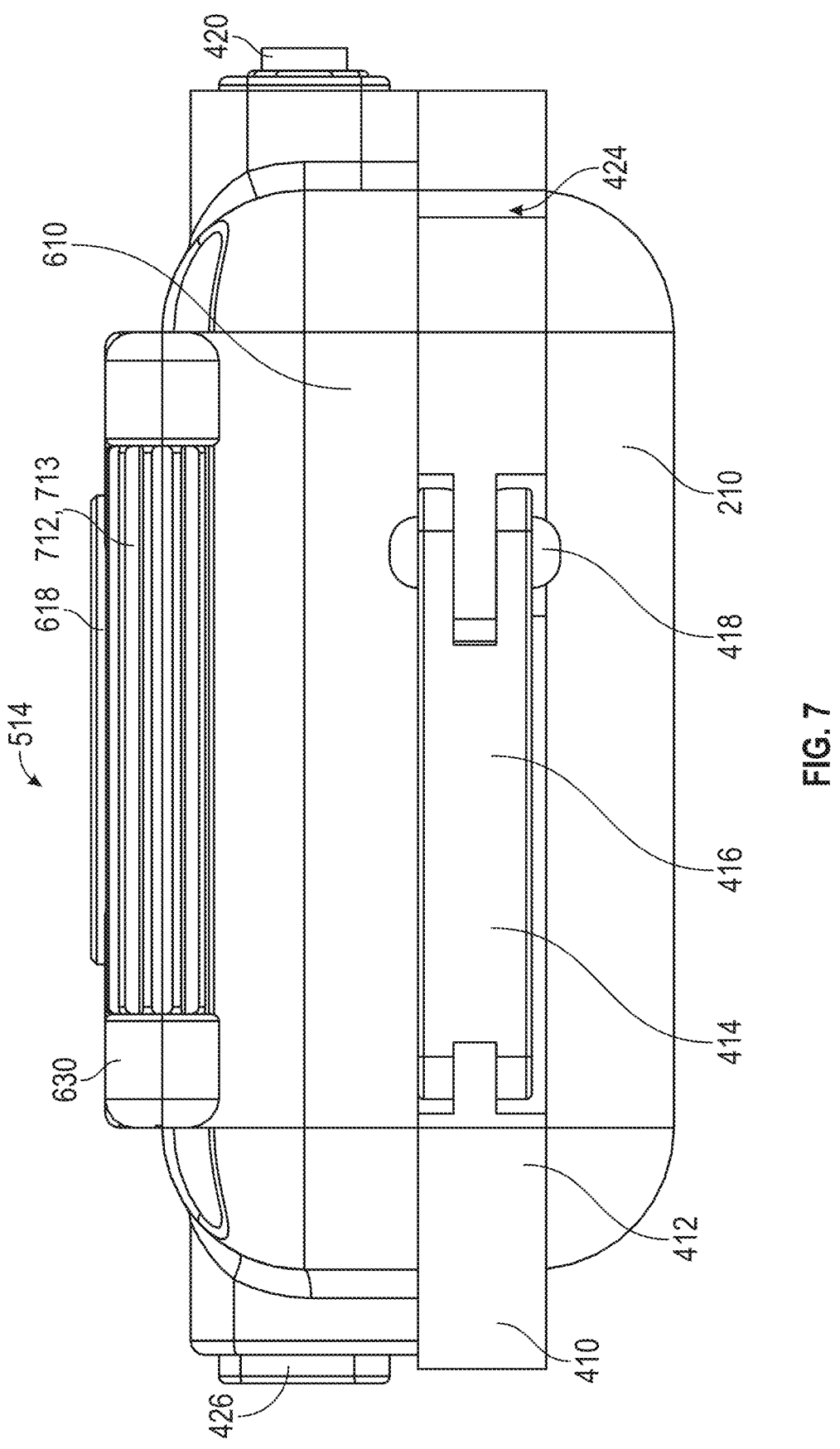
FIG. 7 is a top view of the portable lighting device of FIG. 1.

The central support 410 includes the securement means 428 that is integrally formed with the body 427. In the embodiment shown in the Figures, the securement means 428 is a clip assembly 431 that may be known as a carabineer. The clip assembly 431 includes: (i) a vertical member, (ii) a hinged member 414 connected to the vertical member by hinge pin 418, and (iii) a curvilinear extent 412 that is configured to engage a terminal extent of the hinged member 414. The hinged member 414 is biased in the closed position, which is shown in FIGS. 2, 5-7, and 9-13, by a spring 416. The application of force on the hinged member 414 overcomes this biasing force to move the hinged member 414 to the open position, which is shown in FIGS. 1 and 3. It should be understood that other securement means 428 configured to attach the light 10 to another object are contemplated by this disclosure. Such securement means 428 include: alligator clips, clamps, coiled rings, or connectors (e.g., bayonet-style, quarter-turn, pin and socket, etc.)

The central support 410 also includes the peripheral segment 424 that is integrally formed with the central portion of the body 427 and the securement means 428. The peripheral segment 424 includes a first projection 424a and a second projection 424b that provide an irregular periphery 425 that is configured to allow the peripheral segment 424 to be used as an opener for a bottle or can. In particular, the irregular periphery 425 allows a user to place an extent of a cap of a bottle within an opening 423 in the peripheral segment 424. The user can then apply upwardly directed force on the bottle in order to remove the cap from the bottle. It should be understood that in other embodiments, the peripheral segment 424 may be configured with a different periphery that allows the peripheral segment 424 to function as a knife, punch, saw, scissors, tweezer, file, corkscrew, screwdriver, or wrench. Further, in other embodiments, housing 14 may include multiple accessories. For example, housing 14 may include two accessories, one configured as a bottle opener and a second configured as a knife.

As shown in FIGS. 2, 3, 6, and 9-11, the rear body 610 is designed to encase part of the electronic components 1000 and provide multiple mounting mechanisms that allow a user to position the light in a desired location or at a desired angle. The rear body 610 includes: (i) rear wall 650 and (ii) an arrangement of side walls 660 that extend from the rear wall 650. The rear wall 650 includes: (i) a projection 618 that encircles a coupling means 514. The coupling means 514 in this embodiment is a magnet, which allows a user to releasable couple the light 10 to a magnet or a substrate/ surface that is ferromagnetic. For example, metals that contain iron may be ferromagnetic. It should be understood that in other embodiment, the coupling means 514 may be an adhesive member, hook and look fastener, or any other type of fastener that is designed to removably couple the light 10 to a support surface SS.

Figure 8:
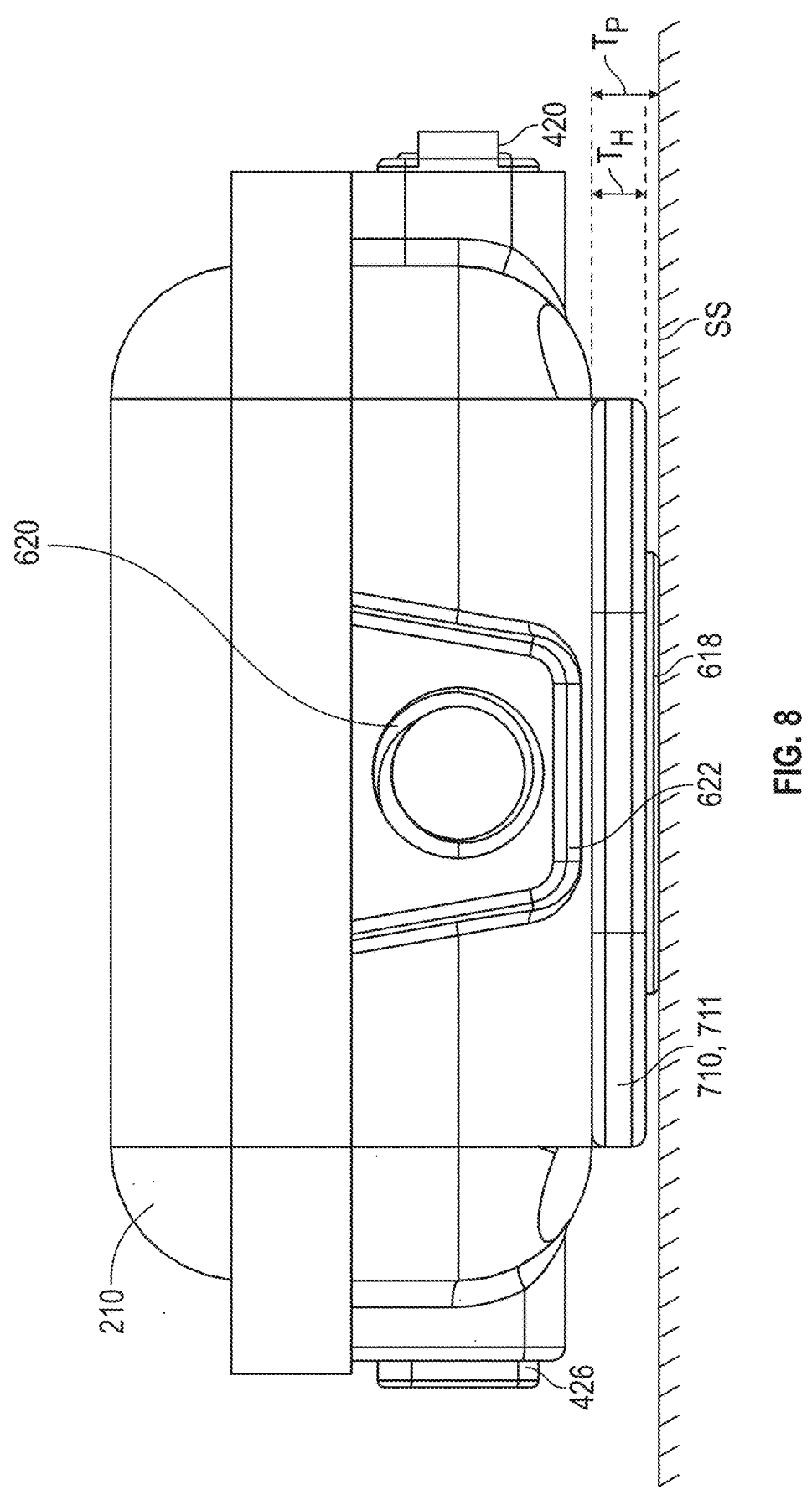
FIG. 8 is a bottom view of the portable lighting device of FIG. 1.
Figure 9:
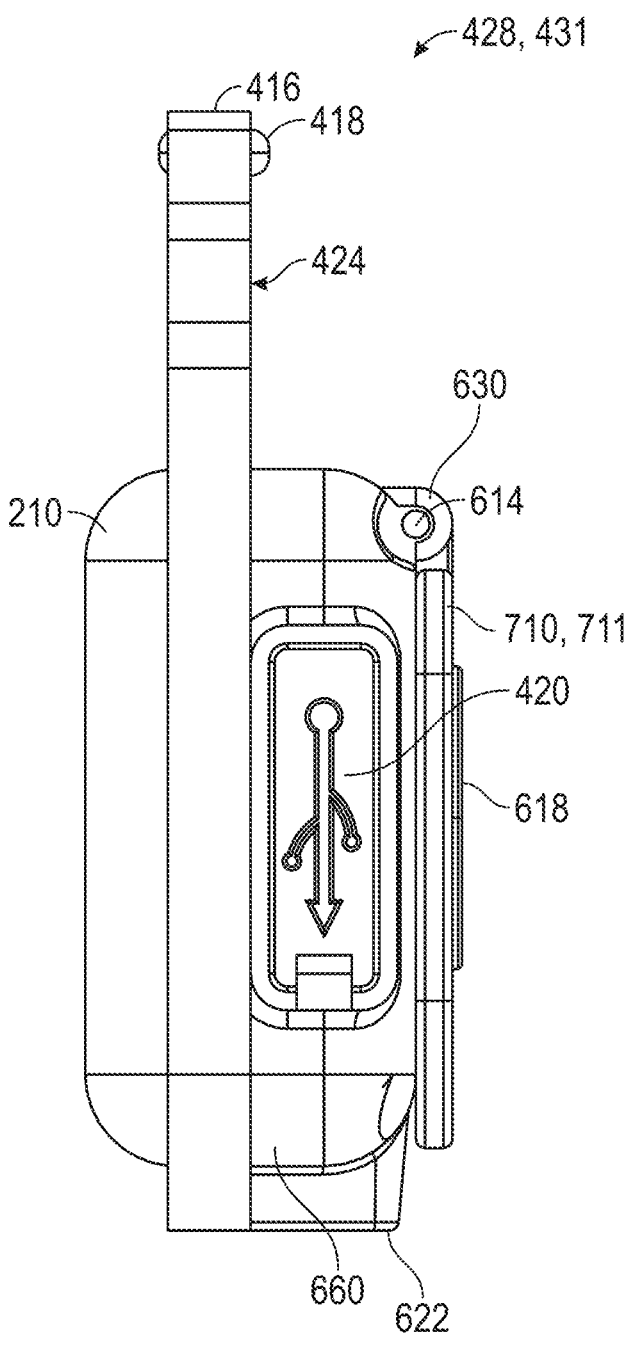
FIG. 9 is a right side view of the portable lighting device of FIG. 1.
Figure 10:
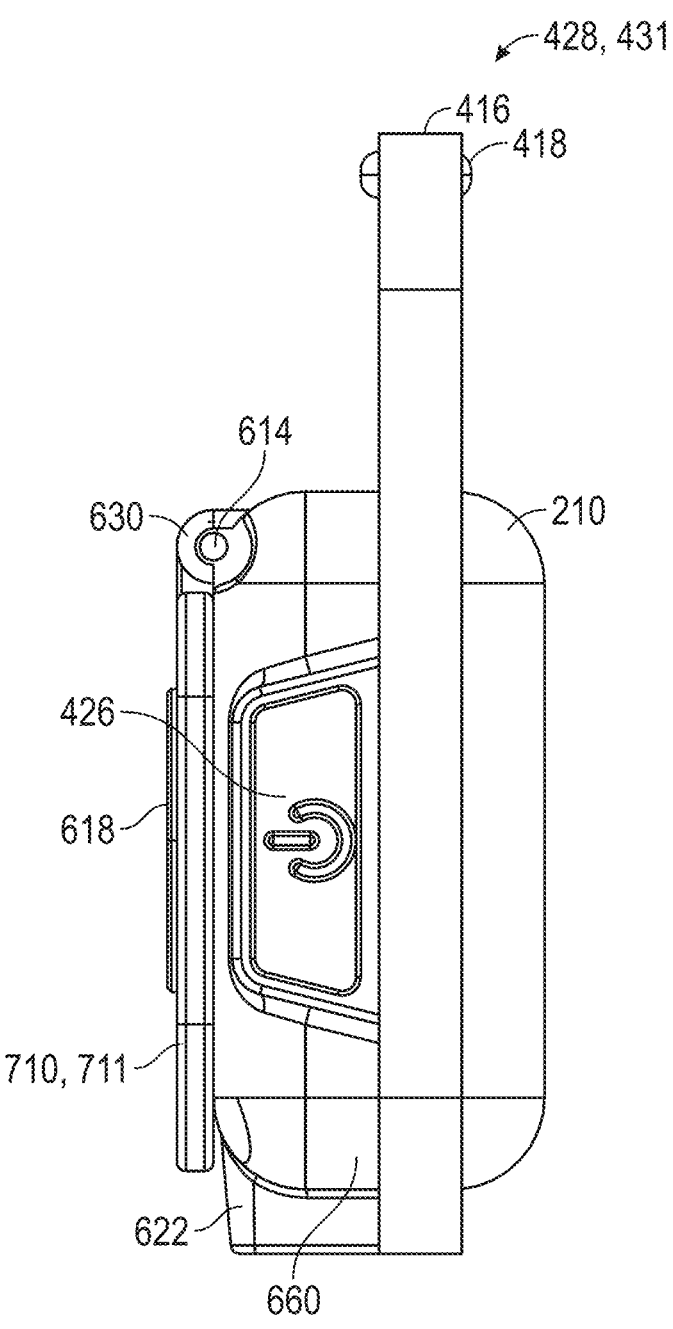
FIG. 10 is a left side view of the portable lighting device of FIG. 1.
Figures 12, 13:
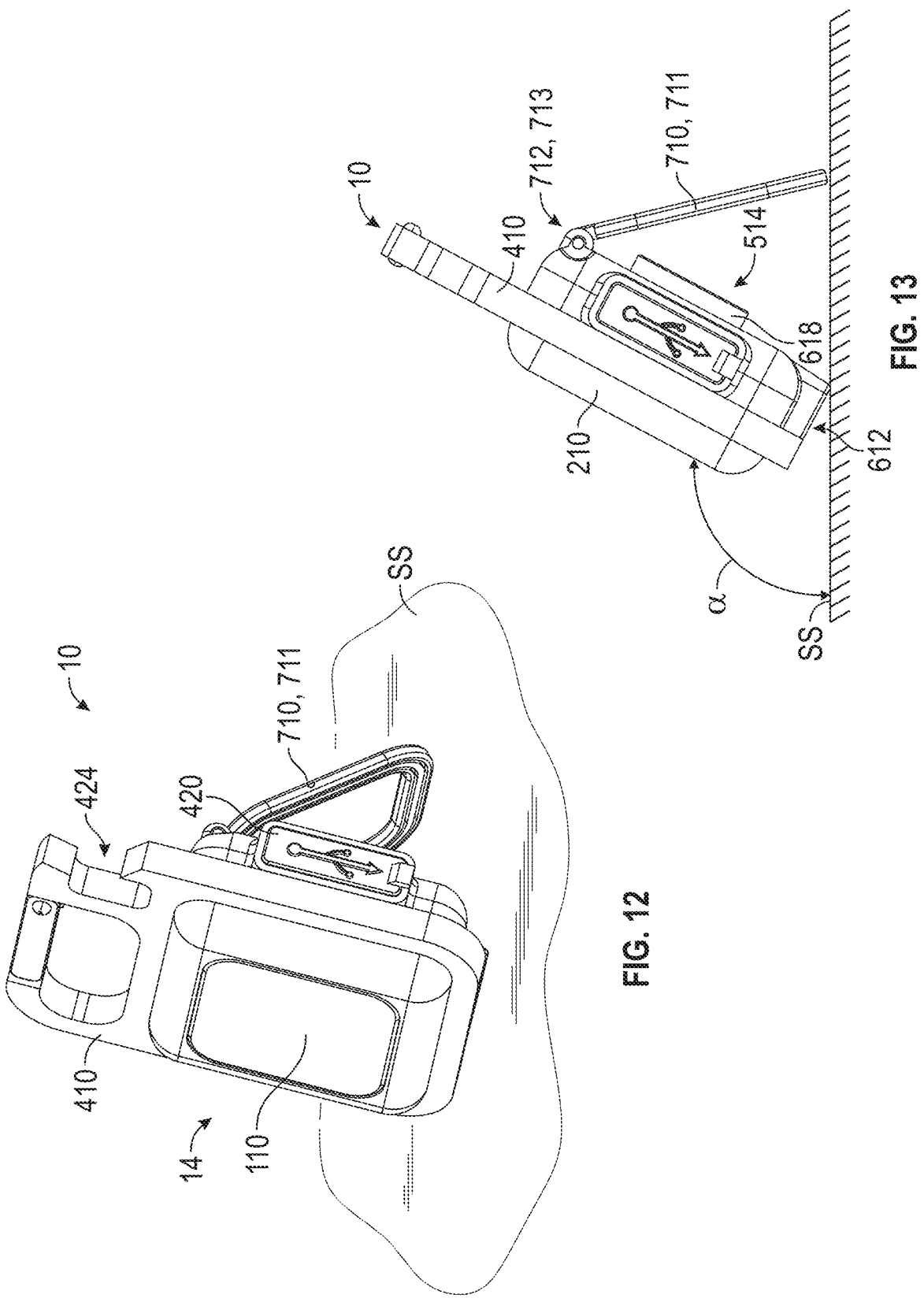
FIG. 12 is a front perspective view of a portable lighting device with the multi-positional member in the deployed position.
FIG. 13 is a right side view of the portable lighting device of FIG. 12.

As best shown in FIGS. 3, 6, and 11-13, the rear wall 650 of the rear body 610 also includes an arrangement of projections 630 that is configured to receive an elongated member 614 that couples a multi-positional assembly 710 to the rear body 610. The multi-positional assembly 710 is configured to function as a support member or kickstand for the light 10, which allows the user to place the light 10 on a support surface ("SS") and direct the light at a specific angle. In other words, a user may place the light 10 on the support surface SS, wherein a lower edge of the arrangement of side walls 660 and an extent of a multi-positional assembly 710 are in contact with the support surface SS. As shown by the arrows in FIG. 13, the user can then alter the angle of the emitted light by moving the multi-positional assembly 710 closer or further away from the rear wall 650. To ensure that the multi-positional assembly 710 remains at the desired distance away from the rear wall 650, the multi-positional assembly 710 includes an elongated body 713 that has a plurality of projections 712 that is configured to interact with a plurality of projections 628 that extend from the rear wall 650. Here, the multi-positional assembly's 710 plurality of projections 712 is temporarily deformable, such that when a user applies a sufficient upwardly directed force on the multi-positional assembly 710, the projections 712 deform to allow the multi-positional assembly 710 to move from a first or retracted position to a second or deployed position. In the retracted position, the multi-positional member 710 (a) resides against the rear wall 650 of the rear body 610, (b) is flush with the coupling means 514 (e.g., a magnet) and does not extend rearward beyond the coupling means 514, and (c) does not interfere with the releasable securement or engagement between the coupling means 514 and the support surface SS to which the coupling means 514 is engaged. Also in the retracted position, the coupling means 514 is nested in or resides within the multi-positional member 710. In the deployed position, the multi-positional member 710 pivotally extends at angle from the rear wall 650 of the rear body 610 wherein the multi-positional assembly 710 supports the lighting device 10 in a desired support angle α ("alpha") that ranges between 91° and 179° relative to the support surface SS in order to provide proper orientation of the light discharged out of the lens 110, as shown in FIGS. 12 and 13. Additionally, to ensure that the multi-positional assembly 710 can position the light at the desired angles, the multi-positional assembly 710 includes a hoop 711 that extends from the elongated body 713. The hoop 711 has an opening 714 therein, which allows it to surround the magnetic means 514 and fit substantially flush against the rear wall 650. The multi-positional assembly 710 or hoop 711 has a thickness TH that is less than the thickness $T_p$ of the projection 618. As such, in the retracted or first position, the multi-positional assembly 710 or hoop 711 allows the magnet means 514 to engage or come into contact with a support surface SS, which is best shown in FIG. 8. It should be understood that in other embodiments, projections 628, 710 may be replaced with another mechanism that allows for the hoop 711 to remain at the desired position (e.g., spring-biased member, a clamping member, magnet member, or other similar members).

As best shown in FIGS. 2, 3, and 9-10, the arrangement of side walls 660 of the rear body 610 includes: (i) charging port receptacle 612 and (ii) operational switch receptacle 624. The charging port receptacle 612 and operational switch receptacle 624 are configured to receive the extent of the electronic components 1000 that are positioned within housing 14. These receptacles 612, 624 permits the user to charge, discharge, and change the operational mode of the light 10. The charging port receptacle 612 has a cover 420, and the switch receptacle 624 has a protective member 426. The cover 420 and protective member 426 are designed to protect the electronic components 1000 from external solid, liquid, and/or gaseous matter, which in some embodiments allows the light to be substantially waterproof (e.g., ip67 or ip68).

As shown in FIGS. 8 and 11, the arrangement of side walls 660 also includes a mounting means 622. This mounting means 622 that is designed to affix the light 10 to another item. An example of this mounting means is a receptacle 620 that is dimensioned and threaded to receive a screw that is typically found on a tripod, bipods, weighted mounting bases, flat stands, or singular extensions (e.g., selfie sticks). It should be understood that other types of mounting means 622 are contemplated by this disclosure, such as bayonet-style connectors, quarter-turn connectors, pin and socket connectors, and other similar types of connectors. As shown in FIGS. 2 and 11, the arrangement of side walls 660 also includes a recessed portion 616 that is designed to underlay and receive the central support 410. This recessed portion 616 allows the rear body 610 to interact with the central support 410 and the front bezel 210 in order to couple these three items to one another. It should be understood that other ways of coupling the rear wall 660 to the other parts of housing 14 are contemplated by this disclosure. For example, the rear body 650 may receive a projection that extends from the central support 410.

Referring to FIG. 2, the interior retaining means 430 that is designed to secure the electronic components 1000 to each other within the housing 14. In particular, the interior retaining means 430 includes a plurality of retaining members 422 that are configured to couple a power supply 432 to the light emitting printed circuit board (PCB) 310. As discussed above, the interior retaining means 430 includes a number of grooves 434a, 434b that are configured to receive the projections 216a, 216b of the front bezel 210. The interior retaining means 430 is also configured such that it does not obstruct either the charging port receptacle 612 or the operational switch receptacle 624. Finally, the retaining members 422 of the interior retaining means 430 are configured such that they boarder a power source PCB 510.

As shown in FIGS. 2 and 11, housing 14 of the light 10 contains electronic components 1000 that are configured to control the operation mode of the light source 312 and in connection with certain operation modes, the electronic components 1000 will emit light outside of the housing 14. The electronic components 1000 include: (i) an illumination assembly 120 and (ii) a power supply assembly 550. As best shown in FIG. 2, the illumination assembly 120 includes: (i) a lens 110, (ii) a light source 312, and (iii) light source PCB 310. The lens 110 is a lens between light source 312 and forward most extent of the front bezel 210. The lens 110 may be a lens and may have a cross-sectional shape that is: (i) substantially rectangular, (ii) convex, or (iii) concave. This cross-sectional shape may be chosen based on the desired light distribution and the type of light source 312. The lens 110 is a primary optic because it overlays multiple emitters of the emitter assembly and the individual emitters do not have additional optics. Alternatively, the lens 110 may be a secondary optic, if the individual emitters that are contained within the light source 312 have their own optics. This may be true if traditional, standard, single package LEDs are utilized instead of a Chip on Board ("COB") LED or surface-mount device LED. The lens 110 may be made from a clear plastic or from durable glass material.

The light source 312 may be formed from various different types of emitter assemblies. For example, the light source 312 may be comprised of: (i) a standard LED, (ii) organic LED, (iii) induction light panel, (iv) silicon quantum dot phosphor (SiQD-phosphor), or (v) surface-mount device LED. In addition, different color emitters (e.g., red, green, blue) may be contained within the light source 312. Specifically, the light source 312 may be composed of between 1 and 60 individual emitters, preferably between 10 and 40 individual emitters, and most preferably between 15 and 30 individual emitters. In some embodiments, every individual emitter of light source 312 is configured to illuminate when power is applied to the light source 312 through switch 516. The primary light source 312 may produce between 0 and 3000 lumen, preferably between 0 and 1000, and most preferably between 0 and 300.

The light source PCB 310 is configured to supply power to the light source 310. For example, the light source PCB 310 may be configured to only illuminate a percentage of the emitters contained within the light source 310. For example, a user may be able to select the desired individual emitters that the user wants to illuminate, while keeping other individual emitters unilluminated, which can vary the brightness of the emitted light. In another embodiment, the light source PCB 310 may only supply a limited amount of power to all or a subset of the emitters. Lowering the suppled power will reduce the light that is emitted from the light source 310.

As shown in FIGS. 2, and 11, the light 10 includes the power supply assembly 550 that includes: (i) a control PCB 510, (ii) a power source 432, (iii) a charging port 512, and (iv) an operational switch 516. The control PCB 510 includes a charging/discharging port 512, which meets the USB-C standard. Meeting this standard allows the light 10 to: (i) receive electrical current from an external source (110 v wall outlet) in order to charge the internal power source 432 and (ii) supply electrical current from power source 432 to an external device such as a mobile phone. In other embodiments, the charging/discharging port 512 may only be a charging port or may only be a discharging port. For example, port 512 may take the form of a micro-USB port, which can only receive electrical current from an external supply and cannot discharge current to charge an external device. Finally, in an alternative embodiment, port 512 could be removed and the power source 432 could recharge through wireless recharging mechanisms or could provide power to an external device wirelessly.

The switch 516 of the light 10 enables the user to alter the operational mode of the light 10. This is done by altering the current that can pass from the power source 432 to flow to the light source 312 to illuminate or turn "On" the light 10. In an illustrated embodiment, switch 516 is activated by pressing switch protector 426 that the user depresses and releases to change the operational mode of the light 10. For example, the user: (i) may depress the switch 516 one time to turn "On" the light source 312, (ii) may depress the switch 516 two times to turn "Off" the light source 312, or (iii) may depress the switch 516 three times to place the light source 312 in a flashing mode. In another example, the user may depress and hold the switch 516, which causes the light source 312 to continuously switch operational modes until the switch 516 is released. In a further example, the user may depress and hold the switch 516, which causes the light source 312 to reduce the amount of light that is emitted from the light 10 such that the light source 312 is dimmed. It should be understood that in alternative embodiments, the light 10 may include multiple light sources 312. For example, the light 10 may have between 1 and 15 light sources 312.

It should also be understood that switch 516 may be replaced with an assembly that is configured to utilize switches, sliders, or sensors physically coupled to the light 10 (e.g., motion, light, sound, or heat). In other embodiments, the switch 516 may be replaced with an assembly that is configured to connect to any of the following devices using wired (802.11, FireWire, etc.) or wireless protocols (e.g., Bluetooth, Wi-Fi, NFC, etc.): (i) sensors (e.g., motion, light, sound, or heat) that are positioned at a distance from the light 10 or (ii) other devices (e.g., cell phone, laptop, RF remote control, remote devices described in U.S. patent application Ser. No. 15/812,852, and which is fully incorporated herein by reference, or other devices that are connected to the light 10 via the internet) that that are positioned at a distance from the light 10. In even further embodiments, the light may have any combination of the above devices or sensors. For example, light 10 may include switch 516 along with a light sensor that is positioned within housing 14. It should be understood that the light 10 and specifically the light source 312 may be controlled by any of the above disclosed devices or sensors. For example, the light 10 may be placed within an operational mode that allows the light 10 to turn ON in response to sensing a flash by a secondary device.

The power source 432 is configured to provide current to the light source 312. In particular, the power source 432 may be a non-removable, rechargeable battery. In other embodiments, the power source 432 may be a removable non-rechargeable battery, a removable rechargeable battery, a combination of removable rechargeable batteries, a combination of removable rechargeable batteries disposed within a battery cartridge, a combination of non-removable rechargeable batteries disposed within a battery cartridge, a DC power supply that is configured to connect to a 12-volt car battery, a DC power supply that is configured to connect to a 110-volt alternative current outlet, or any other type of power supply that is known to a person of skill in the art.

While some implementations have been illustrated and described, numerous modifications come to mind without significantly departing from the spirit of the disclosure; and the scope of protection is only limited by the scope of the accompanying claims. For example, the overall shape of the light 10, or the shape of individual components of the light 10, may be altered to be any one of the following shapes a triangular prism, a rectangular prism, a cylinder, a pentagonal prism, a hexagonal prism, octagonal prism, sphere, a cone, a tetrahedron, a cuboid, a dodecahedron, an icosahedron, a torus, an octahedron, an ellipsoid, or any other similar shape.

The light 10 may include a speaker and a wireless module (e.g., a module that is compatible with Bluetooth, NFC, Felica, Wi-Fi, Zigbee, RFID, cellular, WiMAX, ISM, or any combination of these technologies) to enable a user to play music from the light 10.

The light 10 may include a female receptacle 515 that is configured to receive an extent of a male projection in order to couple the light 10 in a substantially vertical position. Specifically, the combination of the male projection and female receptacle 515 may be in the form of a snap fastener (otherwise known as press stud, popper, snap, or tich) that can be typically found on a jacket or other pieces of clothing. Here, the female receptacle 515 may be positioned inside of the coupling means 514 (see FIG. 6) and may be cooperatively dimensioned to receive the male projection of the snap fastener. Once the male projection has been properly received by the female receptacle 515, the light 10 will be coupled to the jacket or other piece of clothing. This may be beneficial for a hiker that can illuminate the trail by clipping the light 10 to his jacket.

The power source 432 can be a rechargeable battery that is not intended to be removed from housing 14. The housing 14 may be formed from: (i) metal, such as aluminum or steel, (ii) a polymer material, such as plastic, (iii) a magnetic material, or (iv) a combination of the prior material. The lens 110 may be made from a polymer material, such as plastic, and may be transparent, partially transparent, or colored.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A portable lighting device allowing for hands-free lighting in various situations and locations, the portable lighting device comprising:
a front body having a frontal opening;
an illumination assembly having a light source configured to emit light through the frontal opening;
a central support affixed to the front body, the central support having a securement means extending from an upper extent of the central support;
a rear body affixed to the central support, the rear body having a kickstand pivotally connected to a wall of the rear body, wherein the kickstand orients a lower portion of the front body at a desired support angle α relative to a support surface upon which the portable lighting device rests in order to direct the emitted light in a specific direction desired by an operator of the portable lighting device; and
a rechargeable, internal power source operably configured to power the illumination assembly.

2. The portable lighting device of claim 1, wherein the securement means includes opposed vertical segments and a transverse segment extending between said vertical segments, and wherein the vertical segments and the transverse segment define an internal opening of the securement means.

3. The portable lighting device of claim 1, wherein the central support has an outer periphery that is greater than an outer periphery of one of the front body and the rear body.

4. The portable lighting device of claim 1, wherein the central support has an outer periphery that is greater than an outer periphery of both the front body and the rear body.

5. The portable lighting device of claim 1, wherein the rechargeable, internal power source includes a rechargeable battery operably connected to a USB charging port.

6. The portable lighting device of claim 5, wherein the USB charging port is located in a side wall of the rear body.

7. The portable lighting device of claim 1, wherein the kickstand has a U-shaped configuration that comprises opposed vertical segments and a transverse segment extending between the vertical segments.

8. The portable lighting device of claim 1, further comprising a magnet positioned within the kickstand.

9. The portable lighting device of claim 1, further comprising a threaded receptacle positioned below the rear body and configured to allow the portable lighting device to be removably connected to a threaded projection.

10. The portable lighting device of claim 1, wherein the rear body has a depressible switch operably connected to the illumination assembly, wherein the switch can be depressed multiple times by a user of the portable lighting device to change the operating mode of the light source.

11. The portable lighting device of claim 1, wherein the rear body has a depressible switch operably connected to the illumination assembly, wherein the switch can be depressed and held by a user of the portable lighting device to change the operating mode of the light source.

12. The portable lighting device of claim 1, wherein the light source comprises at least 10 emitters that produce between 0 and 1000 Lumens.

13. A portable lighting device allowing for hands-free lighting in various angular orientations relative to a support surface upon which the portable lighting device is situated, the portable lighting device comprising:
a front body having a curvilinear frontal opening;
an illumination assembly having a light source configured to emit light through the curvilinear frontal opening;
a central support affixed to the front body, the central support having a securement means extending from an upper peripheral extent of the central support;
a rear body affixed to the central support;
a multi-positional assembly pivotally connected to the rear body, wherein the multi-positional assembly can be positioned at an angle to the rear body and rest on a support surface in order to direct the emitted light in a specific direction desired by an operator of the portable lighting device; and
a rechargeable, internal power source operably configured to power the illumination assembly.

14. The portable lighting device of claim 13, wherein the securement means includes opposed vertical segments and a transverse segment extending between said vertical segments, and wherein the vertical segments and the transverse segment define an internal opening of the securement means.

15. The portable lighting device of claim 13, wherein the central support has an outer periphery that is greater than an outer periphery of one of the front body and the rear body.

16. The portable lighting device of claim 13, wherein the central support has an outer periphery that is greater than an outer periphery of both the front body and the rear body.

17. The portable lighting device of claim 13, wherein the multi-positional assembly has a U-shaped configuration that comprises opposed vertical segments and a transverse segment extending between the vertical segments.

18. The portable lighting device of claim 17, wherein the transverse segment of the multi-positional assembly includes an upper surface and a lower surface, wherein the lower surface engages the support surface.

19. The portable lighting device of claim 13, wherein the rear body has a depressible switch operably connected to the illumination assembly, wherein the switch can be depressed multiple times by a user of the portable lighting device to change the operating mode of the light source.

20. The portable lighting device of claim 13, wherein the rear body has a depressible switch operably connected to the illumination assembly, wherein the switch can be depressed and held by a user of the portable lighting device to change the operating mode of the light source.

21. The portable lighting device of claim 13, wherein the light source comprises at least 10 emitters that produce between 0 and 1000 Lumens.

22. The portable lighting device of claim 13, further comprising a magnet positioned within the multi-positional assembly.

\* \* \* \* \*